(12) United States Patent
Sun et al.

(10) Patent No.: US 12,210,120 B2
(45) Date of Patent: Jan. 28, 2025

(54) OPTICAL PHASED ARRAY LIDAR

(71) Applicants: THE CHINESE UNIVERSITY OF HONG KONG, SHENZHEN, Guangdong (CN); SHENZHEN INSTITUTE OF ARTIFICIAL INTELLIGENCE AND ROBOTICS FOR SOCIETY, Guangdong (CN)

(72) Inventors: Caiming Sun, Guangdong (CN); Hongjie Wang, Guangdong (CN); Aidong Zhang, Guangdong (CN)

(73) Assignees: THE CHINESE UNIVERSITY OF HONG KONG, SHENZHEN, Guangdong (CN); SHENZHEN INSTITUTE OF ARTIFICIAL INTELLIGENCE AND ROBOTICS FOR SOCIETY, Guangdong (CN)

( * ) Notice: Subject to any disclaimer, the term of this patent is extended or adjusted under 35 U.S.C. 154(b) by 979 days.

(21) Appl. No.: 17/213,284

(22) Filed: Mar. 26, 2021

(65) Prior Publication Data
US 2021/0215799 A1    Jul. 15, 2021

(30) Foreign Application Priority Data
May 28, 2020 (CN) .......................... 202010470839.7

(51) Int. Cl.
*G01S 7/00* (2006.01)
*G01S 7/481* (2006.01)
*G01S 17/89* (2020.01)

(52) U.S. Cl.
CPC ............ *G01S 7/4814* (2013.01); *G01S 17/89* (2013.01)

(58) Field of Classification Search
USPC ....................................................... 356/5.01
See application file for complete search history.

(56) References Cited

U.S. PATENT DOCUMENTS 9,702,975 B2 * 7/2017 Brinkmeyer .......... G01S 7/4818
10,866,319 B2 * 12/2020 Brinkmeyer .......... G01S 7/4818
(Continued)

FOREIGN PATENT DOCUMENTS

CN     105785398 A     7/2016
CN     106597413 A  *  4/2017   ........... G01S 7/4817
(Continued)

OTHER PUBLICATIONS

First Office Action dated Mar. 1, 2022 for Chinese patent application No. 202010470839.7, English translation provided by Global Dossier.
(Continued)

*Primary Examiner* — James R Hulka
(74) *Attorney, Agent, or Firm* — Yue (Robert) Xu; Apex Attorneys at Law, LLP (57) ABSTRACT

An optical phased array lidar includes: a laser, for emitting a laser signal; an optical beam splitter, for splitting a laser signal into multiple sub-signals, and distributing them to corresponding optical paths; a phase controller connected to the optical beam splitter, for regulating phases of the multiple sub-signals; an optical antenna array based on a one-dimensional grating structure, connected to the phase controller and for uniformly scattering the phase-regulated sub-signals into free space; and a silicon nitride waveguide array, for transmitting the sub-signals and phase-regulated sub-signals to realize the transmission of near-infrared light and visible light. The optical phased array lidar uses a silicon nitride waveguide array for transmission, thereby realizing the transmission of near-infrared light and visible light. In this way, the lidar can work in the visible light band, thereby broadening the working ranging thereof.

11 Claims, 7 Drawing Sheets

(56) References Cited

U.S. PATENT DOCUMENTS

| | | | |
|---|---|---|---|
| 2015/0301178 A1* | 10/2015 | Brinkmeyer | G01S 17/32 |
| | | | 250/227.23 |
| 2018/0100924 A1 | 4/2018 | Brinkmeyer | |
| 2021/0033709 A1 | 2/2021 | Holleczek et al. | |

FOREIGN PATENT DOCUMENTS

| | | | | |
|---|---|---|---|---|
| CN | 106773028 A | | 5/2017 | |
| CN | 109270550 A | * | 1/2019 | ............ G01S 17/89 |
| DE | 102015004272 A1 | | 10/2016 | |
| DE | 102018204708 A1 | | 10/2019 | |
| WO | 2017113094 A1 | | 7/2017 | |

OTHER PUBLICATIONS

Second Office Action dated Jul. 29, 2022 for Chinese patent application No. 202010470839.7, English translation provided by Google translate.

* cited by examiner

OPTICAL PHASED ARRAY LIDAR

CROSS-REFERENCE TO RELATED APPLICATIONS

This application claims priority to Chinese patent application No. 202010470839.7, titled "OPTICAL PHASED ARRAY LIDAR", filed May 28, 2020, with the China National Intellectual Property Administration, which is incorporated herein by reference in its entirety.

FIELD

The present disclosure relates to the technical field of optical phased array, and in particular to an optical phased array lidar.

BACKGROUND

At present, mature lidar (light detection and ranging) schemes adopt mechanical rotation to achieve beam scanning, which faces many problems such as large volume and power consumption, slow scanning speed, and high cost, while the lidar based on microelectromechanical systems has a small scanning angle and is sensitive to vibrations. The optical phased array radar is an all-solid-state lidar, which effectively solves the problems of the above two common lidars. However, the silicon-based optical phased array chip has a working wavelength larger than 1100 nm and cannot work within the visible light band, which limits its application range.

Therefore, how to provide a solution to the above technical problems is an issue that those skilled in the art need to address currently.

SUMMARY

An object of the present application is to provide an optical phased array to realize the transmission of near-infrared light and visible light, which broadens its working range. The specific solutions are as follows.

An optical phased array includes:
a laser, configured to emit a laser signal;
an optical beam splitter, configured to split the laser signal to obtain multiple sub-signals, and distribute the multiple sub-signals to respective optical paths;
a phase controller, connected to the optical beam splitter and configured to regulate phases of the multiple sub-signals;
a silicon nitride waveguide array, configured to transmit the multiple sub-signals and the phase-regulated sub-signals, to realize the transmission of near-infrared light and visible light; and
an optical antenna array based on a one-dimensional grating structure, connected to the phase controller and configured to uniformly scatter the phase-regulated sub-signals into free space.

Optionally, the phase controller includes: first silicon nitride waveguides corresponding to the multiple sub-signals and an electrical controller, and
the electrical controller includes micro heaters configured to regulate temperatures of the first silicon nitride waveguides, and the micro heaters are arranged in a staggered manner so that regions heated by the micro heaters are non-overlapping with each other.

Optionally, a length of the first silicon nitride waveguide is the same as a length of the micro heater.

Optionally, each two adjacent micro heaters of the micro heaters are staggered end to end, the micro heaters are divided into multiple groups, and starts of the multiple groups of micro heaters are aligned with each other.

Optionally, the optical antenna array includes multiple grating antennas, and
the grating antenna includes a second silicon nitride waveguide and a silicon dioxide layer covering the second silicon nitride waveguide.

Optionally, the second silicon nitride waveguide includes multiple grating periodic structures, and the grating periodic structure is a tooth-shaped structure, where a wavelength of the sub-signal is regulated by a tooth depth of the tooth-shaped structure.

Optionally, tooth depths of the second silicon nitride waveguide are non-uniform.

Optionally, adjacent grating antennas of the grating antennas transmit at different powers, or the grating antennas are arranged in different densities.

Optionally, the optical phased array lidar further includes:
an optical beam combiner and an optical detector connected to the optical beam combiner, and
the optical detector is one of a PIN (p-i-n) photodiode detector, an avalanche photodiode detector and a single photon detector.

Optionally, the laser is a wavelength-tunable laser.

Optionally, the silicon nitride waveguide array is a one-dimensional array.

It can be seen that in the optical phased array lidar according to the present disclosure, the optical beam splitter distributes the beam of a laser signal into multiple optical paths corresponding to respective sub-signals; the phase controller configured in the optical paths generates a corresponding additional phase for each sub-signal in a corresponding optical path to achieve phase regulation, to obtain corresponding phase-regulated sub-signals; both the sub-signals and the phase-regulated sub-signals are transmitted by the silicon nitride waveguide array, which realizes the transmission of near-infrared light and visible light. Thus, the present invention can work within the visible light band, which broadens its working range. The phase-regulated sub-signals are transmitted into free space by the optical antenna array and converge into one point in a far field, and the phase controller regulates the position of the convergence point, to achieve light spot scanning.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

In the following, the technical solutions of the embodiments of the present disclosure will be described clearly and completely in conjunction with the accompanying drawings of the embodiments of the present disclosure. It is apparent that the described embodiments are only part of embodiments of the present disclosure. All other embodiments obtained by those skilled in the art based on these embodiments of the present disclosure without any creative work shall fall within the scope of protection of the present disclosure.

Figure 1:
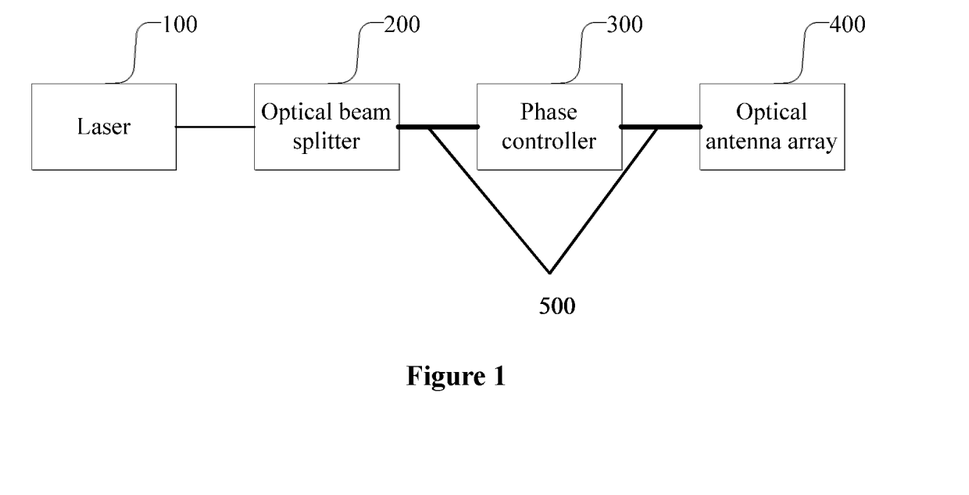
FIG. 1 shows a structural schematic diagram of an optical phased lidar according to an embodiment of the present disclosure.

In view of the technical problems as mentioned in the background section, the present disclosure provides an optical phased array lidar, which can realize the transmission of near-infrared light and visible light, thereby broadening the working range. Reference is made to FIG. 1, which shows a structural schematic diagram of an optical phased lidar according to an embodiment of the present disclosure, including:

a laser 100, for emitting a laser signal 110;

an optical beam splitter 200, for splitting the laser signal 110 into multiple sub-signals 111, and distributing the multiple sub-signals 111 to corresponding optical paths;

a phase controller 300 connected to the optical beam splitter 200, for regulating phases of the multiple sub-signals 111;

a silicon nitride waveguide array 500, for transmitting the sub-signals 111 and the phase-regulated sub-signals, to realize the transmission of near-infrared light and visible light; and an optical antenna array 400 based on a one-dimensional grating structure, connected to the phase controller 300 and for uniformly scattering the phase-regulated sub-signals into free space along a direction of a grating antenna in the optical antenna array; and In an embodiment, the optical phased array lidar may operate in the following manner. The laser 100 emits a laser signal 110, and the optical beam splitter 200 distributes the beam of the laser signal 110 into multiple optical paths. For example, the number of multiple optical paths is N, that is, the laser signal 110 is divided into N sub-signals 111. The phase controller 300 adds a corresponding additional phase to each of the N sub-signals 111, to achieve phase regulation. When output lights of the N optical paths, i.e., the N sub-signals 111, enter the optical antenna array 400 and are scattered into the free space, they will be combined into one beam at somewhere relatively far away from the optical antenna array 400 due to optical interference, so as to complete light spot scanning, where a deflection direction of the combined beam is controlled by the phase controller 300.

In the embodiment, the sub-signals 111 and the phase-regulated sub-signals are both transmitted through the silicon nitride waveguide array 500. Applying the silicon nitride material to the optical phased array lidar can extend the working range of the optical phased array from infrared light to visible light, and realize the transmission of near-infrared light and visible light. In other words, the silicon nitride waveguide array 500 exists in the optical beam splitter 200, the phase controller 300, and the optical antenna array 400 to transmit corresponding signals.

It can be understood that all waveguides in the optical beam splitter 200, the phase controller 300 and the optical antenna array 400 in the embodiment are made of a silicon nitride material, including a multi-stage multi-mode interference (MMI) coupler in the optical beam splitter 200, heated phase-regulating waveguides (first silicon nitride waveguides), and grating antennas. The first silicon nitride waveguide is under a micro heater, and changes, after being heated, an optical length by the thermos-optic effect, thereby achieving the purpose of phase regulation.

In an embodiment, the laser 100 is a non-broad-spectrum laser, and the narrower the line width is, the better the coherence is. The laser 100 may be a wavelength-tunable laser 100, and light spot scanning in one dimension can be achieved by tuning a wavelength.

Figure 2:
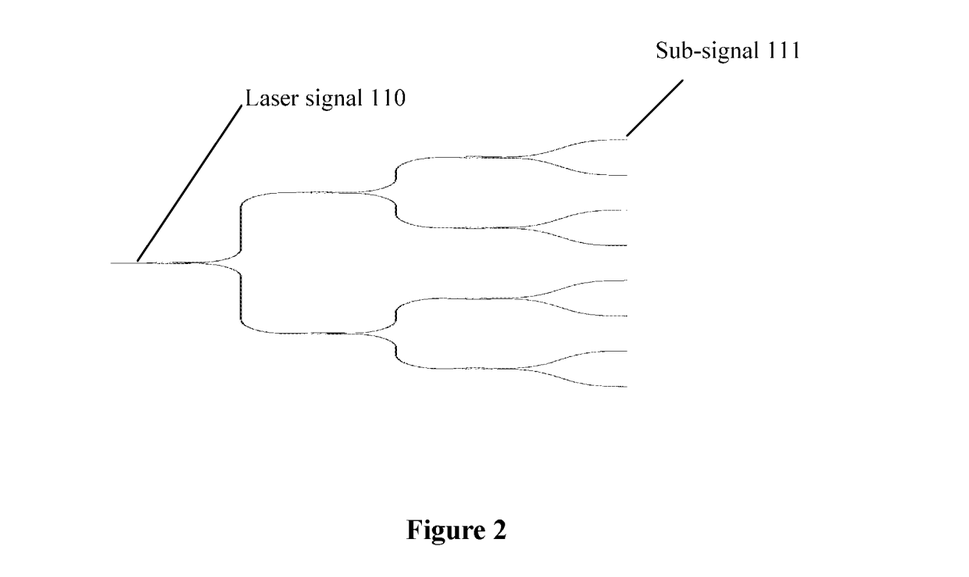
FIG. 2 shows a schematic diagram of an optical beam splitter according to an embodiment of the present disclosure.

The optical beam splitter 200 is further described in the following. In an embodiment, the optical beam splitter 200 includes a one-to-two multi-stage multi-mode interference (MMI) coupler, and the number N of MMI stages determines the number of optical paths to be $2^N$. The optical lengths of the $2^N$ optical silicon nitride waveguides are the same. There are multiple optical paths in the optical beam splitter 200. The optical beam splitter 200 splits the laser signal 110 into multiple sub-signals 111, and each sub-signal 111 is transmitted to the phase controller 300 through a silicon nitride waveguide corresponding to an optical path. Reference is made to FIG. 2, which shows a schematic diagram of an optical beam splitter splitting a beam according to an embodiment of the present disclosure.

The phase controller 300 is further described in the following. The phase controller can be achieved by the thermo-optic effect. Compared with silicon materials, the thermo-optical effect of waveguides of silicon nitride materials, i.e., silicon nitride waveguides, is much weaker. Therefore, a longer silicon nitride waveguide need to be heated to achieve a $2\pi$ phase shift. The phase controller includes: a first silicon nitride waveguide corresponding to each sub-signal 111 and an electrical controller, and the electrical controller includes: multiple micro heaters 310, each of which heats a corresponding first silicon nitride waveguide. In the embodiment, the micro heaters 310 and the first silicon nitride waveguides are not limited, and can be customized by users.

A length of the first silicon nitride waveguide may be more than, or equal to, a length of a corresponding micro heater 310, as long as different temperatures of the first silicon nitride waveguide can be regulated by controlling the power of the micro heater 310. Preferably, in order to reduce the production price and ensure uniform heating, the length of the first silicon nitride waveguide is equal to the length of the corresponding micro heater 310.

Figure 3:
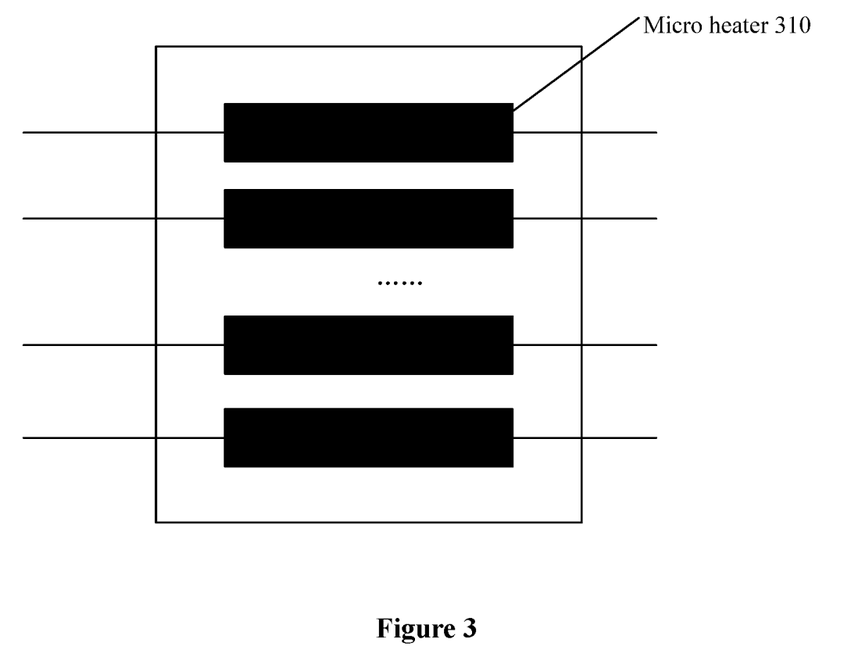
FIG. 3 shows a schematic diagram of an arrangement of micro heaters according to an embodiment of the present disclosure.

The first silicon nitride waveguides and the micro heaters 310 may be arranged in a routine manner. Reference is made to FIG. 3, which shows a schematic diagram of an arrangement of micro heaters according to an embodiment of the present disclosure. The routine arrangement is prone to mutual disturbances to cause uneven heating and different temperatures. To reduce the mutual disturbances between the micro heaters 310, the micro heaters 310 are staggered so that regions heated by different micro heaters 310 do not overlap with each other. In an embodiment, the phase controller 300 includes first silicon nitride waveguides corresponding to the sub-signals 111 and an electrical controller, and the electrical controller includes micro heaters 310 for regulating temperatures of the first silicon nitride waveguides, where the micro heaters 310 are staggered with each other so that regions heated by the micro heaters 310 are non-overlapping with each other. Further, each two adjacent micro heaters are staggered end to end; the micro heaters 310 are divided into multiple groups of micro heaters, and starts of the multiple groups of micro heaters are aligned with each other.

Figure 4:
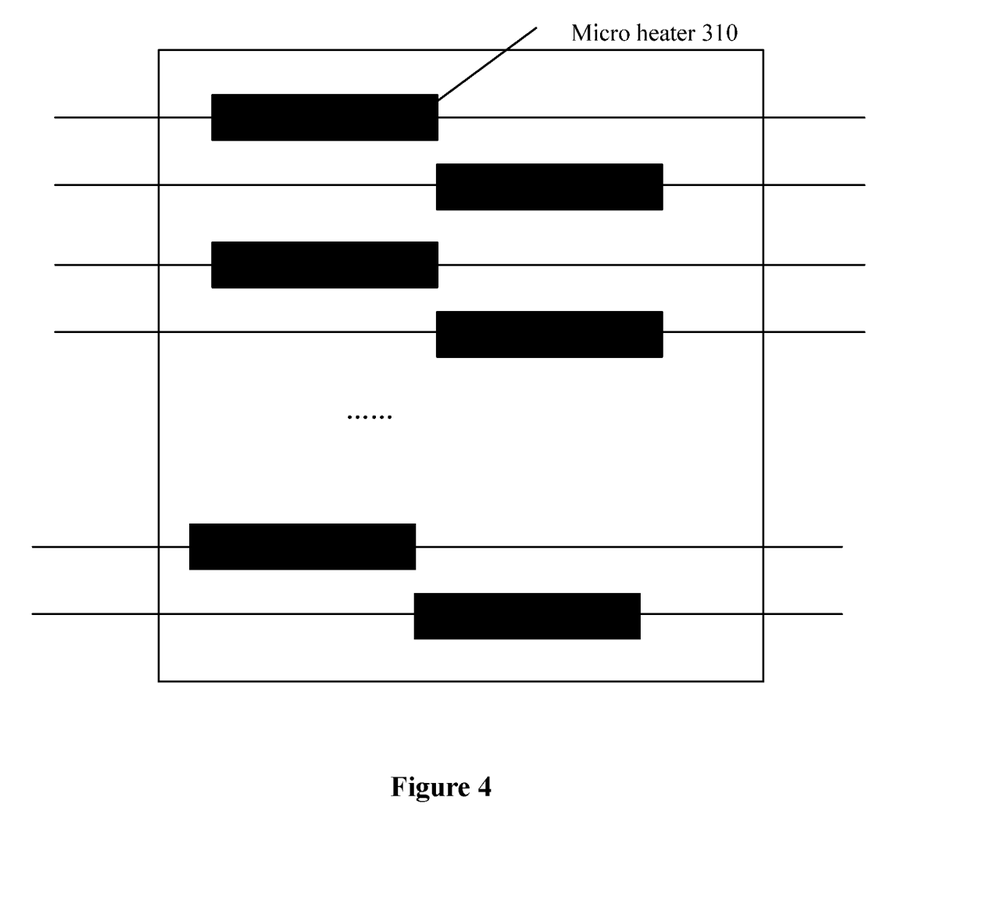
FIG. 4 shows another schematic diagram of an arrangement of micro heaters according to an embodiment of the present disclosure.

Reference is made to FIG. 4, which shows another schematic diagram of an arrangement of micro heaters according to an embodiment of the present disclosure, and the micro heaters 310 are arranged in a staggered manner as shown in FIG. 4. The first silicon nitride waveguide requires a longer heating length. A way to improve the degree of integration and reduce the size is to stagger by groups: two or more micro heaters 310 constituting a group are staggered end to end, and the heads of the multiple groups of micro heaters 310 are aligned. The staggered arrangement by groups reduces mutual disturbances between the heaters and improves the degree of integration of a chip.

Figure 5:
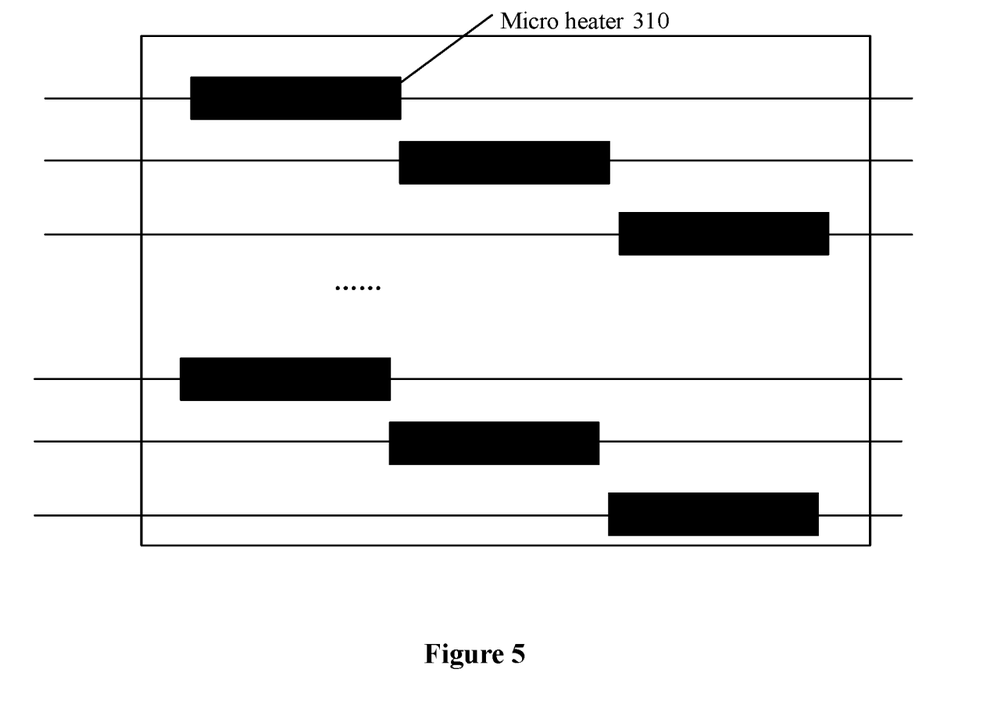
FIG. 5 shows another schematic diagram of an arrangement of micro heaters according to an embodiment of the present disclosure.

Reference is made to FIG. 5, which shows another schematic diagram of an arrangement of micro heaters according to an embodiment of the present disclosure. Each black strip represents a micro heater 310, which is generally made of a high-temperature resistant metal material, such as copper and tungsten, and is arranged above the silicon nitride waveguide shown as a thin line in the figure. Understandably, it is merely an example that each group includes two micro heaters 310; in a case that each group includes more micro heaters, for example, 1024 micro heaters, the 1024 micro heaters may be divided into 32 groups with 32 micro heaters in each group.

The optical antenna array 400 is further described in the following. The optical antenna array 400 is an antenna array based on a one-dimensional grating structure. The phase-regulated sub-signals are uniformly scattered into free space along the direction of the grating antenna in the optical antenna array. The optical antenna array 400 may be used as a transmitting and receiving device for optical signals and is composed of a series of grating structural antennas, i.e., multiple grating antennas. The one-dimensional grating structure based antenna array can realize light spot scanning by wavelength scanning, which is convenient for manufacture, has low cost and good reliability, and avoids the problem that a two-dimensional array cannot realize light spot scanning by wavelength scanning.

Further, to form the periodically changing condition of grating refraction, in the embodiment, the optical antenna array 400 includes multiple grating antennas, and the grating antenna includes a second silicon nitride waveguide and a silicon dioxide layer covering the second silicon nitride waveguide.

Further, the second silicon nitride waveguide includes multiple grating periodic structures, and the grating periodic structure is a tooth-shaped structure, to regulate the wavelength of the sub-signal 111 by a tooth depth of the tooth-shaped structure.

Figure 6:
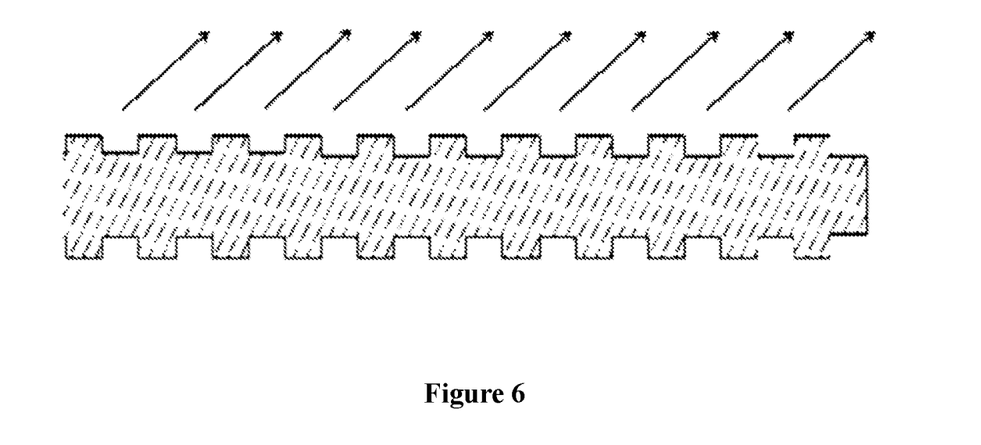
FIG. 6 shows a structural schematic diagram of a single grating antenna according to an embodiment of the present disclosure.
Figure 7:
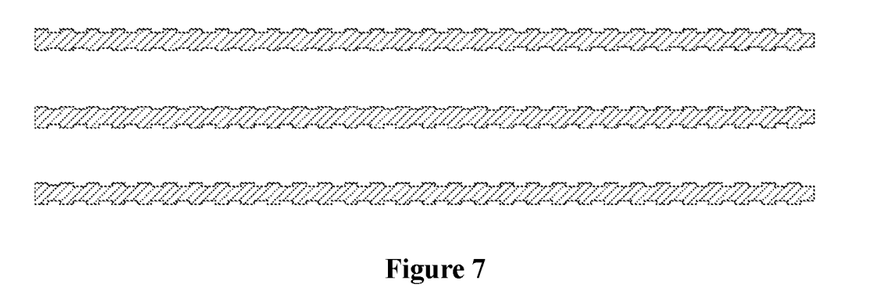
FIG. 7 shows a structural schematic diagram of a grating antenna array according to an embodiment of the present disclosure.

Reference is made to FIG. 6, which shows a structural schematic diagram of a single grating antenna according to an embodiment of the present disclosure. The strip-shaped second silicon nitride waveguide is provided with tooth-shaped structures of different depths, and one protrusion and one recess constitute a period of the grating antenna. The period of the grating antenna affects a center wavelength of scattered light, a depth of the recess affects scattered power per unit length, and the recess of the antenna is filled with a silicon dioxide layer. The difference between effective refractive indexes of the protrusion and of the recess constitutes the periodically changing condition of a refractive index of the grating. The phase-regulated sub-signals are bound to travel in the second silicon nitride waveguide, and after each grating period, some of the phase-regulated sub-signals are scattered out as shown in FIG. 6. Optical signals coming out at the same scattering angle form an equal inclination interference in the far field, which forms bright and dark fringes. For the same grating antenna, different wavelengths correspond to different scattering angles, so a direction of a central bright fringe in the interference fringes can be controlled by regulating a light wavelength. Meanwhile, the phase-regulated sub-signals obtained by the phase controller 300 introduce a fixed phase difference between different grating antennas, which can realize light interference on another dimension. Therefore, the method of combining wavelength scanning and phase control can realize a two-dimensional optical scanning on an antenna array with a one-dimensional grating structure. Reference may be made to FIG. 7 for the specific structure of the optical antenna array 400, which shows a structural schematic diagram of a grating antenna array 400 according to an embodiment of the present disclosure.

Figure 8A:
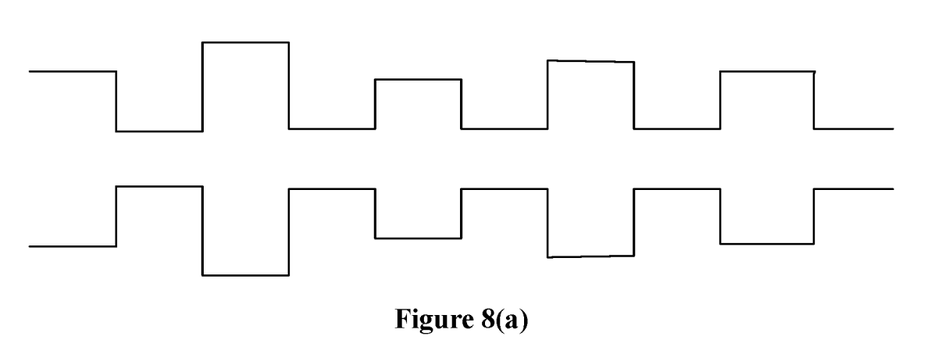
FIG. 8(a) shows another structural schematic diagram of a single grating antenna according to an embodiment of the present disclosure.
Figure 8B:
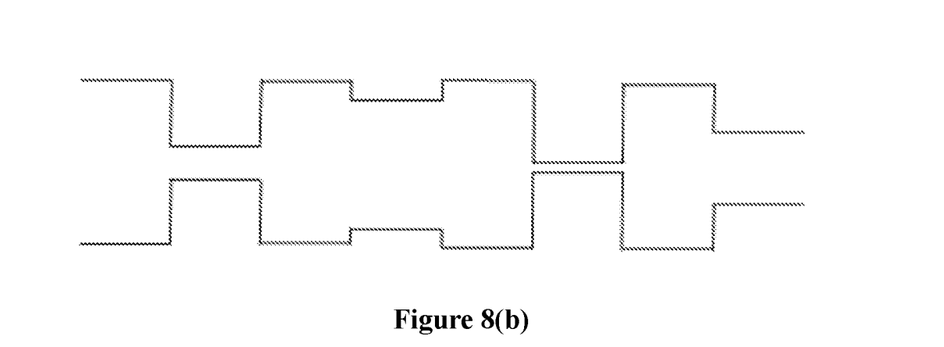
FIG. 8(b) shows another structural schematic diagram of a single grating antenna according to an embodiment of the present disclosure.

The tooth depths of the second silicon nitride waveguide are not limited in the embodiment, which can be uniform or non-uniform. Reference may be made to FIG. 6 for uniform arrangement of tooth depths, and to FIG. 8(a) and FIG. 8(b) for non-uniform arrangement of tooth depths. FIG. 8(a) shows a structural schematic diagram of a single grating antenna according to an embodiment of the present disclosure; FIG. 8(b) shows another structural schematic diagram of a single grating antenna according to an embodiment of the present disclosure.

Figure 9:
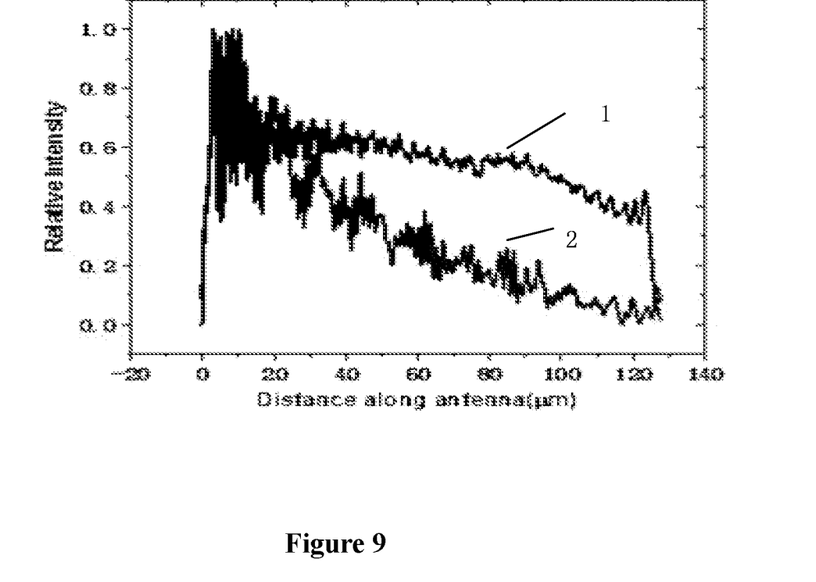
FIG. 9 shows a schematic diagram of output optical powers of uniform arrangement and non-uniform arrangement according to an embodiment of the present disclosure.

Further, to ensure the uniformity of the output light, the tooth depths of the second silicon nitride waveguide are non-uniform. Reference is made to FIG. 9, which shows a schematic diagram of output optical power along an antenna length under a uniform arrangement 1 and a non-uniform arrangement 2 according to an embodiment of the present disclosure. It can be seen that output power is more flat along the antenna length in case of non-uniform tooth depths. Compared with the case that most of the power is transmitted at the beginning of the antenna, uniform light emission over the entire antenna can improve resolution. In the embodiment, the grating antenna length is taken into consideration in the design of the grating antenna. Since an optical signal in a waveguide is strong at the beginning part thereof, the scattering intensity of this part is designed to be weak; the scattering intensity per unit length is enhanced in the ending part of the antenna. Furthermore, non-uniform tooth depths affect the effective refractive index resulting in central wavelength drift. An antenna period can be modified to keep the central wavelength of antenna scattering constant.

Further, adjacent grating antennas of the grating antennas formed by the second silicon nitride waveguide transmit at different powers, or the grating antennas are arranged in different densities.

Figure 10:
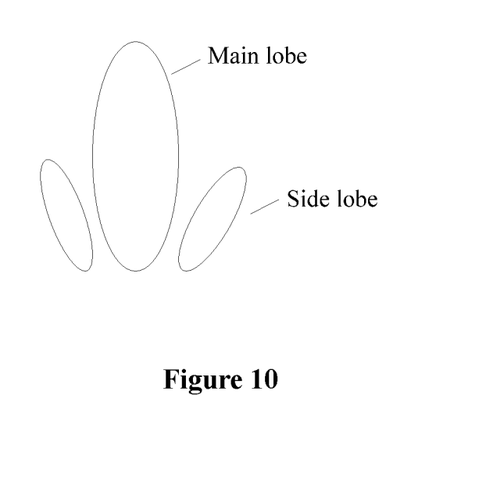
FIG. 10 shows a schematic diagram of a main lobe and side lobes according to an embodiment of the present disclosure.

The signals transmitted from the optical antenna array 400 are shown FIG. 10, which shows a schematic diagram of a main lobe and side lobes according to an embodiment of the present disclosure. The main lobe determines the direction of scattering, while numerous side lobes interfere to some extent. The way to suppress the side lobes is to make the optical power transmitted by each antenna, i.e., the grating antenna, affect the overall interference unevenly. Two methods are introduced below. If the transmitting powers of different antennas are the same, the antennas may be arranged in different densities so that the density at the center of the optical antenna array 400 is greater than that on the two sides. If the antennas are arranged in the same density, the tooth depths can be modified, on the basis of ensuring that a center transmission wavelength of each antenna remains unchanged and light is outputted evenly along the antenna, to make transmission powers of antennas different. For example, the antenna A has non-uniform tooth depths to ensure the uniformity of the output power and a constant center wavelength, and on such a basis, the tooth depths of all periods on this antenna are modified, to improve the overall output power of the antenna. In this way, although for a single antenna A or B, the center wavelength remains unchanged and the output power is uniform, the antennas A and B have different overall output powers. The uniformity of the output power and the constant center wavelength are in the sense of a single antenna. On this basis, the antennas may further be modified to make the output powers of different antennas different. Increasing the power ratio of the main lobe to the side lobes is good for concentrating energy, increasing the detection distance and improving the scanning resolution.

The silicon nitride waveguide array 500 is for transmitting the sub-signals and the phase-regulated sub-signals to realize near-infrared and visible light transmission. The silicon nitride waveguide array 500 includes a first silicon nitride waveguide, a second silicon nitride waveguide, and a waveguide for signal transmission in the beam splitter. The silicon nitride waveguide array 500 is a one-dimensional array. When the silicon nitride waveguide array 500 is a one-dimensional array, the corresponding optical antenna array 400 is also a one-dimensional array. In this case, light spot scanning can be realized by wavelength scanning, which is convenient for manufacture and has low cost and good reliability. It can be seen that, compared with the two-dimensional array, light spot scanning can be achieved by wavelength scanning, while the two-dimensional array cannot realize spot scanning by wavelength scanning.

The optical phased array lidar further includes an optical beam combiner 600 and an optical detector 700 connected to the optical beam combiner 600; the optical detector 700 is one of a PIN photodiode detector, an avalanche photodiode detector and a single photon detector.

Figure 11:
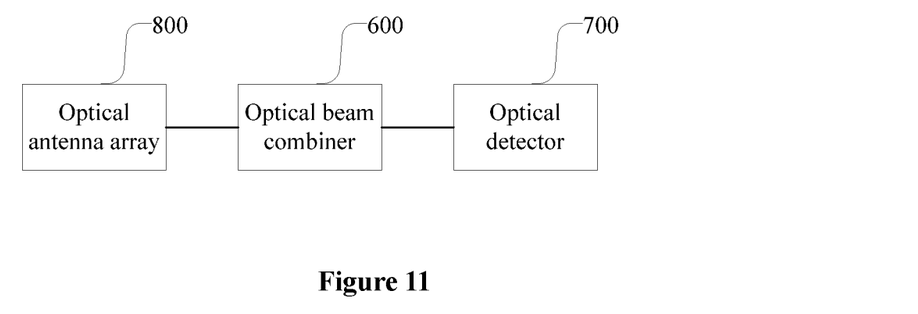
FIG. 11 shows a structural schematic diagram of a receiving terminal according to an embodiment of the present disclosure.

Reference is made to FIG. 11, which shows a structural schematic diagram of receiving terminal according to an embodiment of the present disclosure. Spatial light enters the optical antenna array 800, and the grating structure antenna array in the optical antenna array 800 couples the light into N silicon nitride waveguides. The N signals enter the optical beam combiner 600 and are merged into one signal which then enters the optical detector 700. The optical detector 700 includes but is not limited to a PIN photodiode detector, an avalanche photodiode detector or a single photon detector. In an embodiment, the laser signal 110 is modulated at an emitting terminal of the laser 100, where the modulation may be pulse modulation or continuous wave frequency modulation. The time difference between when the receiving terminal receives a signal and when the emitting terminal emits the laser signal 110 is a traveling time of light in space, and a distance between a detection point and the lidar is equal to a half of the time difference multiplied by the speed of light.

In the optical phased array lidar according to the present disclosure, the optical beam splitter distributes the beam of a laser signal into multiple optical paths corresponds to respective sub-signals; the phase controller configured in the optical paths generates a corresponding additional phase for each sub-signal in a corresponding optical path to achieve phase regulation, to obtain corresponding phase-regulated sub-signals; both the sub-signals and the phase-regulated sub-signals are transmitted by the silicon nitride waveguide array, which realizes the transmission of near-infrared light and visible light. Thus, the present invention can work within the visible light band, which broadens its working range. The phase-regulated sub-signals are transmitted into free space by the optical antenna array and converge into one point in a far field, and the phase controller regulates the position of the convergence point, to achieve light spot scanning.

It should be noted that the various embodiments in this specification are described herein in a progressive manner, with the emphasis of each of the embodiments on the difference between it and the other embodiments; hence, for the same or similar parts between the various embodiments, one can refer to the other embodiments. For the apparatuses disclosed in the embodiments, since they correspond to the methods disclosed in the embodiments, the description is relatively simple, and reference can be made to the description of the methods for the relevant parts.

Professionals shall further realize that the units and algorithm steps of each example described in combination with the embodiments disclosed herein can be implemented by electronic hardware, computer software, or a combination of both. In order to clearly illustrate the interchangeability of hardware and software, the composition and steps of each example have been generally described in accordance with the function in the above description. Whether these functions are executed by hardware or software depends on the specific application and design constraints of the technical solution. Professionals and technicians can use different methods for each specific application to implement the described functions, but such implementation shall not be considered as going beyond the scope of the present invention.

The steps of the method or algorithm described in combination with the embodiments disclosed herein can be directly implemented by hardware, a software module executed by a processor, or a combination of the two. The software module can be placed in random access memory (RAM), internal memory, read-only memory (ROM), electrically programmable ROM, electrically erasable programmable ROM, registers, hard disks, removable disks, CD-ROMs, or any other form of storage medium known in the technical field.

The above describes in detail an optical phased array lidar provided by the present disclosure. Specific examples are used in the article to describe the principles and implementation of the disclosure. The description of the above examples is only used to help understand the method and core ideas of the disclosure. It should be pointed out that for those of ordinary skill in the art, without departing from the principles of the present disclosure, several improvements and modifications can be made to the present disclosure, and these improvements and modifications also fall within the protection scope of the claims of the present disclosure.

The invention claimed is:

1. An optical phased array lidar, comprising:
a laser, configured to emit a laser signal;
an optical beam splitter, configured to split the laser signal to obtain a plurality of sub-signals, and distribute the plurality of sub-signals to respective optical paths;
a phase controller, connected to the optical beam splitter and configured to regulate phases of the plurality of sub-signals;
a silicon nitride waveguide array, configured to transmit the plurality of sub-signals and the phase-regulated sub-signals, to realize the transmission of near-infrared light and visible light; and
an optical antenna array based on a one-dimensional grating structure, connected to the phase controller and configured to uniformly scatter the phase-regulated sub-signals into free space, wherein the optical antenna array comprises a plurality of grating antennas, and in each of the plurality of grating antennas, the phase-regulated sub-signals coming out from the corresponding grating antenna at a same scattering angle form an equal inclination interference in a far field on a first dimension,
wherein the phase controller is configured to introduce a fixed phase difference between different ones of the plurality of grating antennas for the phase-regulated sub-signals, to form light interference on a second dimension.

2. The optical phased array lidar according to claim 1, wherein the phase controller comprises: first silicon nitride waveguides corresponding to the plurality of sub-signals and an electrical controller, and the electrical controller comprises micro heaters for regulating temperatures of the first silicon nitride waveguides, and the micro heaters are arranged in a staggered manner, whereby regions heated by the micro heaters are non-overlapping with each other.

3. The optical phased array lidar according to claim 2, wherein a length of the first silicon nitride waveguide is the same as a length of the micro heater.

4. The optical phased array lidar according to claim 3, wherein
each two adjacent micro heaters of the micro heaters are staggered end to end, the micro heaters are divided into a plurality of groups of micro heaters, and starts of the plurality of groups of micro heaters are aligned with each other.

5. The optical phased array lidar according to claim 2, wherein the optical antenna array comprises a plurality of grating antennas, and
the grating antenna comprises a second silicon nitride waveguide and a silicon dioxide layer covering the second silicon nitride waveguide.

6. The optical phased array lidar according to claim 5, wherein the second silicon nitride waveguide comprises a plurality of grating periodic structures, and the grating periodic structure is a tooth-shaped structure, wherein a wavelength of the sub-signal is regulated by a tooth depth of the tooth-shaped structure.

7. The optical phased array lidar according to claim 6, wherein tooth depths of the second silicon nitride waveguide are non-uniform.

8. The optical phased array lidar according to claim 6, wherein adjacent grating antennas of the grating antennas transmit at different powers, or the grating antennas are arranged in different densities.

9. The optical phased array lidar according to claim 1, further comprising:
an optical beam combiner and an optical detector connected to the optical beam combiner,
wherein the optical detector is one of a PIN photodiode detector, an avalanche photodiode detector and a single photon detector.

10. The optical phased array lidar according to claim 1, wherein the laser is a wavelength-tunable laser.

11. The optical phased array lidar according to claim 1, wherein the silicon nitride waveguide array is a one-dimensional array.

* * * * *